United States Patent
Chelminski

[19]

[11] Patent Number: 6,116,515
[45] Date of Patent: Sep. 12, 2000

[54] METHOD OF USING MICROCRYSTALLINE CELLULOSE TO ENHANCE ARTIFICIAL SNOW MAKING

[76] Inventor: Stephen Chelminski, 30 Danforth Rd., Rindge, N.H. 03461

[21] Appl. No.: 09/244,713

[22] Filed: Feb. 4, 1999

Related U.S. Application Data

[60] Provisional application No. 60/073,991, Feb. 6, 1998.

[51] Int. Cl.[7] ............................................. F25C 3/04
[52] U.S. Cl. ............................ 239/2.2; 239/14.1; 239/14.2
[58] Field of Search .................... 239/2.2, 14.1, 239/14.2

[56] References Cited

U.S. PATENT DOCUMENTS

| | | | |
|---|---|---|---|
| 3,434,661 | 3/1969 | Boyle et al. | 239/2.2 |
| 3,494,559 | 2/1970 | Skinner | 239/2.2 |
| 3,760,598 | 9/1973 | Jakob et al. | 239/2.2 X |
| 4,200,228 | 4/1980 | Woerpel | 239/2.2 |
| 4,793,142 | 12/1988 | Bucceri | 239/2.2 X |
| 5,289,973 | 3/1994 | French | 239/2.2 X |

FOREIGN PATENT DOCUMENTS 403230070  10/1991  Japan ..................................... 239/2.2

*Primary Examiner*—Andres Kashnikow
*Assistant Examiner*—Robin O. Evans
*Attorney, Agent, or Firm*—George W. Dishong

[57] ABSTRACT

A method for making artificial snow using micro particulate material for the performance enhancement of snow making equipment, wherein very small particles of material are mixed into the water supply system which supplies water to the snow making guns at a skiing area. The particles serve as the nucleus for snow crystals to grow upon when sprayed into the atmosphere by the snow making guns. The water, which has the nucleating material mixed into it, is sprayed out of the snow making guns in the form of fine droplets, small enough for the cold ambient air at the skiing slope to freeze the small water droplets into the solid form of snow flakes. The nucleating material, which originally is in the form of a fine powder, may be mixed in a suitable container with a portion of the water, so it can be appropriately metered through a pump, into the water pipe that feeds the snow making guns.

6 Claims, 1 Drawing Sheet

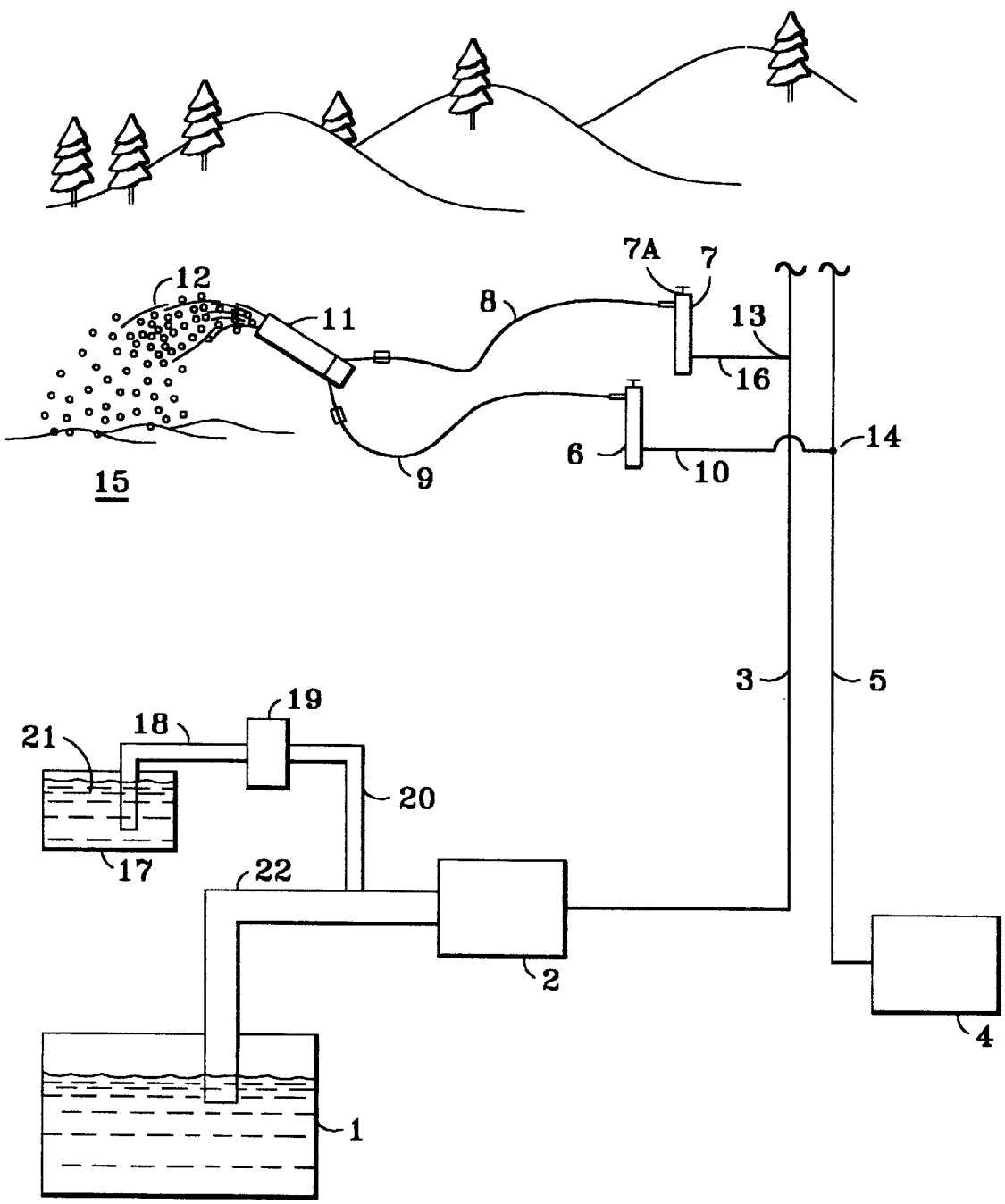

METHOD OF USING MICROCRYSTALLINE CELLULOSE TO ENHANCE ARTIFICIAL SNOW MAKING

This application claims the benefit of U.S. Provisional Application Ser. No. 60/073,991 filed Feb. 6, 1998.

BACKGROUND OF THE INVENTION

1. Field of the Invention

Recreational skiing has been on the increase over the years to the point where ski areas must make snow to supplement natural snow, because in many areas of the world not enough natural snow falls to satisfy the demand for good skiing conditions. Artificial snow, as it is sometimes called, is made in large quantities at many ski areas. Large amounts of energy is used in supplying the snow making guns; both water pumped at relatively high pressure, and compressed air is used. In consideration of the large amounts of energy consumed by the pumps and air compressors, or by the large electric motors which run the snow making machines of the fan type, it is important to increase the efficiency of snow making and reduce the energy required to make an amount of snow, and therefore, effectively reducing the cost of snow making.

2. Description of the Prior Art

It has been found that water droplets freeze into snow crystals more quickly, and at a slightly higher temperature if each droplet has a small particle of material such as dust to act as a nucleus to freeze around. In recent years, materials such as bacteria or yeast, various sugars, wood powders and silica particles for example, have been used for providing a nucleus for snow crystals to grow around. For health reasons some individuals have been concerned about the use of bacteria or yeast as a nucleating agent, which is sprayed into the atmosphere at a ski area. Ordinary cellulose, in the form of wood powder is hard to obtain in a particle size of uniform value in the range of 1 to 15 microns, which is a useful size for the use of snow making. Milled wood, or other types of cellulose, such as wheat stalks, have many unorganized particles which may cause some snow making equipment to clog up from accumulated deposits of the more coarse sized particles. Silica particles are in use at some ski areas, but some concern has been voiced about this substance possibly causing, through long enough exposure, abrasive wear to the snow making equipment which is in intimate contact with this particular nucleating material.

A product with the technical name of "Microcrystalline Cellulose" made by the FMC Corp. is a material made by removing the amorphous parts of the cellulose structure using a chemical process which leaves a more uniform crystal-like material quite unlike that made by milling whole cellulose such as wood fiber to small sized particles. A characteristic of microcrystalline cellulose which clearly distinguishes it from wood fiber types of cellulose is the specific gravity. According to the "Handbook of Chemistry and Physics", the average hardwood has a specific gravity of approximately 0.65 grams per cubic centimeter, while "microcrystalline cellulose" has a specific gravity of approximately 1.5 grams per cubic centimeter.

SUMMARY OF THE INVENTION

It is an object of this invention to provide, for enhanced snow making performance, a micro particulate nucleating material having a crystal-like structure. It is another object of this invention to provide a micro particulate material which is not abrasive to pumping systems, piping, or snow guns. It is also an object of this invention to provide a micro particulate nucleating material which is not based on the bodies of micro organisms dead or alive. It is the primary object of this invention to provide microcrystalline cellulose for use as a nucleus material for snow crystal formation. As an example a microcrystalline cellulose material in a powder form is obtainable from the FMC Corp. The particulate size is in the range of approximately 1 to 30 microns. This particular product is called, powdered AVICEL (registered trade name). In this invention, this material is mixed with water, to form a liquid mixture concentrate.

A primary aspect of the present invention is to provide an improved system for making artificial snow. The known system comprises a snow gun, means for providing either pressure regulated compressed air or fan generated air to the snow gun, means for providing snow gun water from source water to the snow gun in an adjustable amount combination with the compressed air. The improvement comprises: means for mixing a predetermined quantity of small particles of a material in with mix water creating thereby a concentrate; and means for introducing the concentrate into the source water providing thereby enhanced snow gun water. Preferably the small particles are microcrystalline cellulose particles and more preferably the small particles have an average particulate size of between about 1 micron to about 30 microns.

A further primary aspect of the present invention is to provide the improved system for making artificial snow with means for regulating the predetermined quantity of small particles of material or the microcrysalline cellulose particles in an amount to substantially maximize the making of artificial snow, i.e., the amount of snow made based upon the energy expended in making the snow.

Another primary aspect of the present invention is to provide an improved method for making artificial snow. The method comprises providing a snow gun, providing either pressure regulated compressed air or fan generated air to the snow gun, providing snow gun water from source water to the snow gun in adjustable amount in combination with the pressure regulated compressed air,. The improved method comprises: mixing a predetermined quantity of small particles of a material in with mix water creating thereby a concentrate; and introducing the concentrate into the source water providing thereby enhanced snow gun water to the snow guns.

Yet another primary aspect of the present invention is to provide enhanced snow gun water for distribution to snow-making guns. The enhanced snow gun water comprises: a predetermined quantity of small particles of a material intermixed with mix water creating thereby a concentrate; and introducing the concentrate into source water providing thereby enhanced snow gun water. Preferably the small particles are microcrystalline cellulose particles and more preferably the small particles have an average particulate size of between about 1 micron to about 30 microns.

A still yet further primary aspect of the present invention is to provide the enhanced snow gun water for distribution to snow-making guns with means for regulating the predetermined quantity of small particles of material or the microcrysalline cellulose particles in an amount to substantially maximize the making of artificial snow, i.e., the amount of snow made based upon the energy expended in making the snow.

These and further objects of the present invention will become apparent to those skilled in the art to which this invention pertains and after a study of the present disclosure of the invention.

BRIEF DESCRIPTION OF THE DRAWINGS

The FIGURE is an over-view drawing of a typical system for making snow, incorporating a small adjustable pump for injecting microcrystalline cellulose solution into the water supply of a typical snow making system.

DESCRIPTION OF THE PREFERRED EMBODIMENTS

The following is a description of the preferred embodiment of the invention. It is clear that there may be variations in the size and the shape of the system, in the materials used in the construction and in the orientation of the components.

Reference is now made to the drawing. The drawing shows simply the preferred embodiments of the system. It is understood that fan-type snow making guns are included. Should fan-type guns be used there would be an electric motor driving the fan instead of a compressor providing the compressed air.

In the practice of snow making, a water supply 1, such as a stream or pond is required for providing a large supply of water needed for the production of large quantities of artificial snow. A pump 2, is used to draw the water from water supply 1, and pump the water up the mountain through suitable piping 3, to the location where snow is to be made 15. A snow gun 11 is positioned, pointing in the direction which snow is to be placed. Water being pumped up the hill, through piping 3, can be directed to snow gun 11 by the use of a branch line 16 coming from tee 13 in the water line 3. Commonly used, there is a hydrant 7 with a valve 7A to regulate the flow of water flowing to snow gun 11, which is usually connected to the hydrant with a flexible rubber hose 8. Compressed air is also commonly employed in the field of snow making; however, a fan-type of gun may also be used. An air compressor 4 is used to compress air which is used to atomize water into small droplets and expel the mixture of air and water droplets from snow gun 11 onto ski slope 15. An air line 5 coming from air compressor 4, a tee 14, and a branch line 10, an air valve 6, flexible air line 9 carry the air to snow gun 11 in which the air and water mix, forming a projected plume of small water droplets. Microcrystalline cellulose is mixed with water, then placed in supply tank 17. Pump 19, is supplied through suction line 18, and pumps an amount of the microcrystalline cellulose and water concentrate 21 proportional to the flow of water in the suction line, adequate to supply a proper amount nucleating particles into the water supply which feeds the snow making guns, the performance of which is enhanced by having ample amounts of nucleating particles associated with the water droplets which are expelled from the snow making guns. The water supply used for making snow at some ski areas already have tiny particles of solid material in it, which in itself can work well in the nucleation of ice crystals, so the amount of microcrystalline cellulose introduced into the main water flow, must be varied by the operator of the snow guns, which is done by observing the quality and quantity of the snow as it is being made. It is also known that the quality of the snow and the rate of formation is also dependent on the temperature and humidity of the ambient air at the ski area at any given time.

It is also thought that snow making system and the method of making snow and the manner of use and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. In an improved system for making artificial snow said system comprising a snow gun, means for providing air to said snow gun, means for providing snow gun water from source water to said snow gun in adjustable amount combination with said compressed air, said improvement comprising:

means for mixing a predetermined quantity of small particles of a material, wherein said small particles are microcrystalline cellulose particles, said small particles having an average particulate size of greater than 1.0 micron to about 30.0 microns, in with mix water creating thereby a concentrate; and means for introducing said concentrate into said source water providing thereby enhanced snow gun water.

2. The improved system for making artificial snow according to claim 1 further comprising means for regulating said predetermined quantity of microcrystalline cellulose particles of material in an amount to substantially maximize said making of artificial snow.

3. In an improved method for making artificial snow said method comprising providing a snow gun, providing pressure regulated compressed air to said snow gun, providing snow gun water from source water to said snow gun in adjustable amount combination with said pressure regulated compressed air, said improved method comprising:

mixing a predetermined quantity of small particles of a material, wherein said small particles are microcrystalline cellulose particles, said small particles having an average particulate size of greater than 1.0 micron to about 30.0 microns, in with mix water creating thereby a concentrate; and introducing said concentrate into said source water providing thereby enhanced snow gun water.

4. The improved method for making artificial snow according to claim 3 further comprising regulating said predetermined quantity of microcrystalline cellulose particles of material in an amount to substantially maximize making of artificial snow.

5. Enhanced snow gun water for distribution to snow-making guns, said enhanced snow gun water comprising:

a predetermined quantity of small particles of a material, wherein said small particles are microcrystalline cellulose particles said small particles having an average particulate size of greater than 1.0 micron to about 30.0 microns, intermixed with mix water creating thereby a concentrate; and introducing said concentrate into source water providing thereby enhanced snow gun water.

6. The enhanced snow gun water for distribution to snow-making guns according to claim 5 further comprising means for regulating said predetermined quantity of microcrystalline cellulose particles of material in an amount to substantially maximize making of artificial snow.

* * * * *